March 4, 1969  W. G. LEMATTA  3,430,325
APPARATUS FOR SECURING WARNING MARKERS TO CABLES
Filed June 27, 1966  Sheet 1 of 4
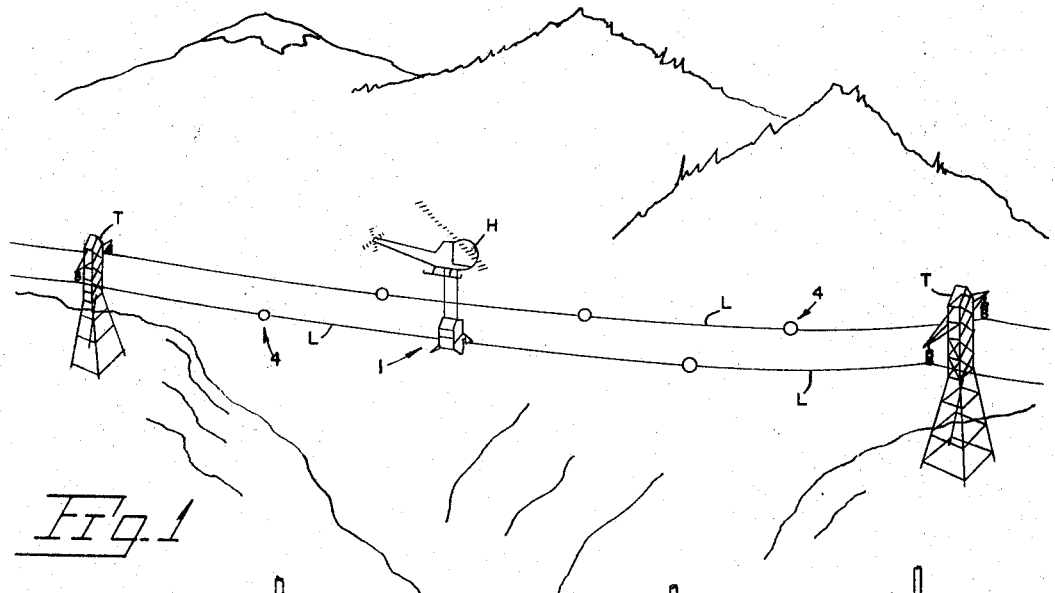
*Fig.1*
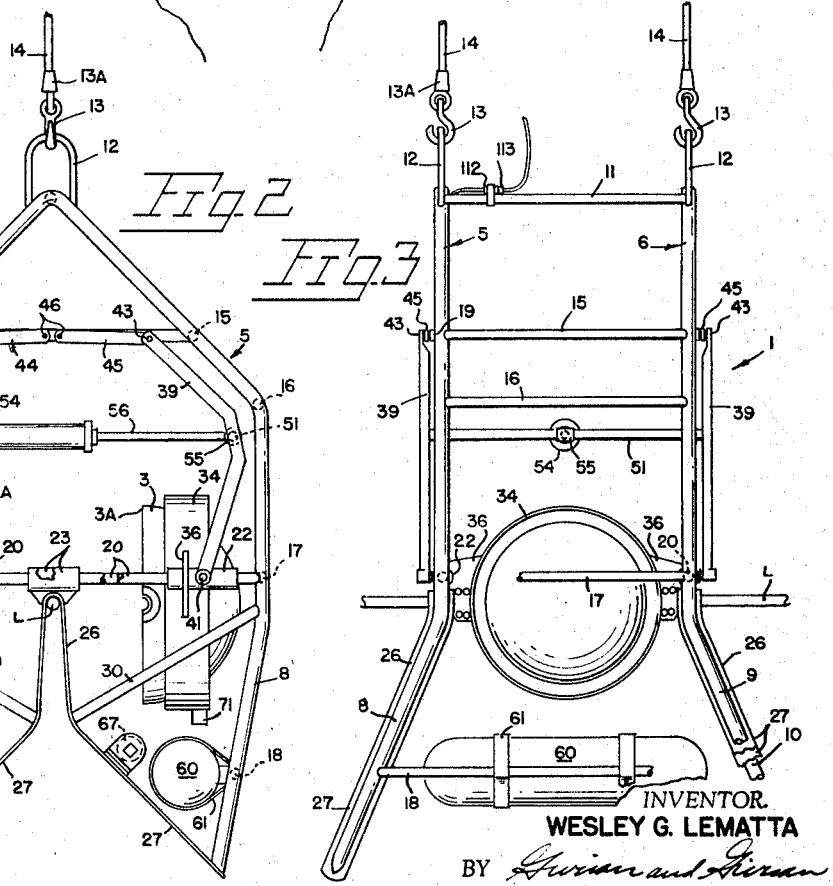
*Fig.2*  *Fig.3*
INVENTOR.
WESLEY G. LEMATTA
BY
AGENTS

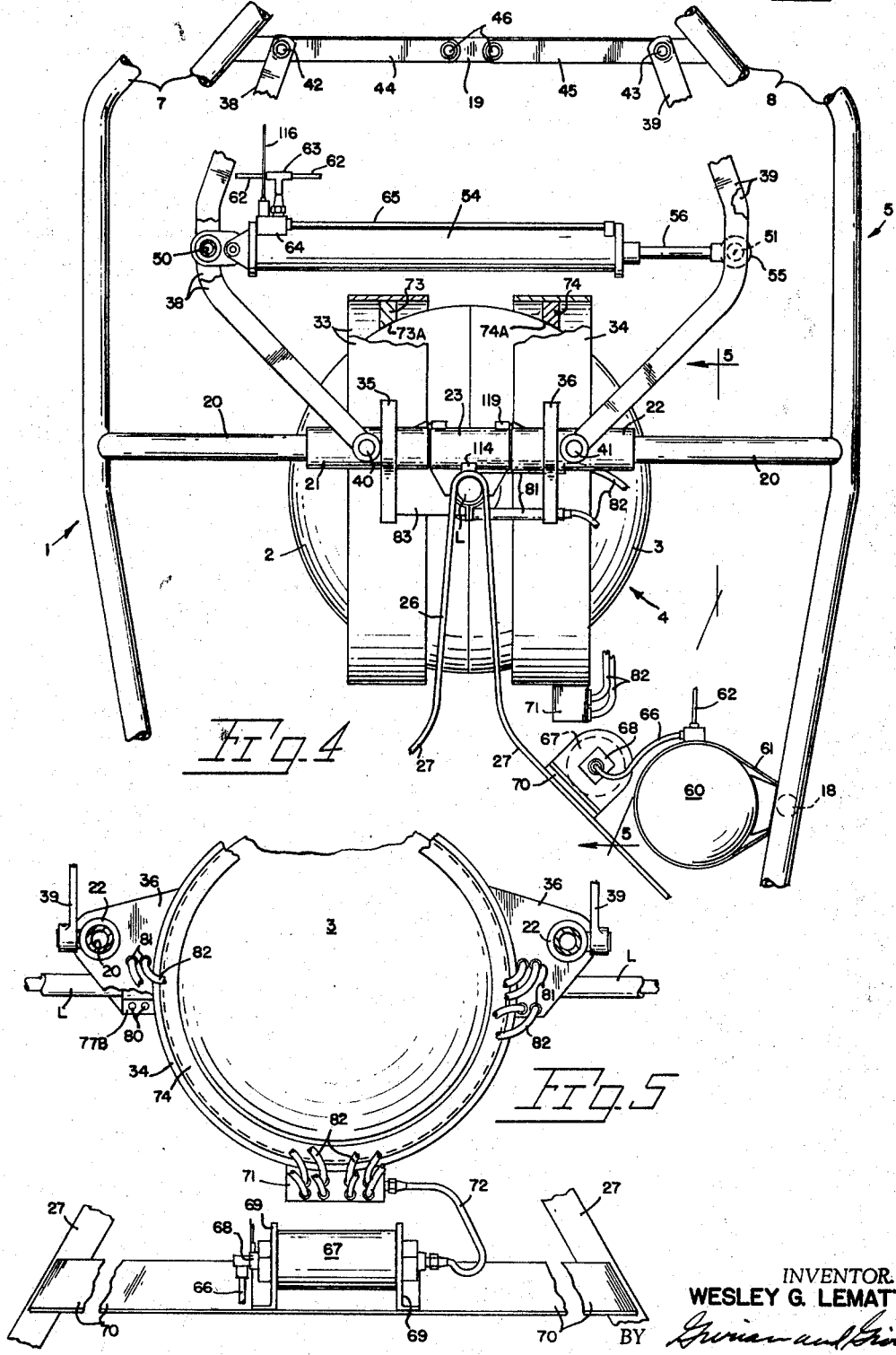

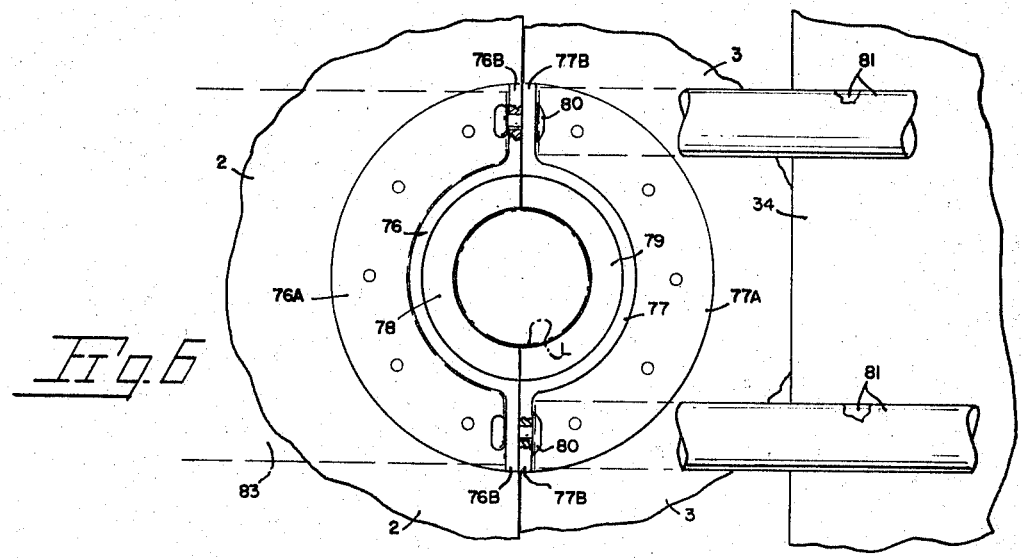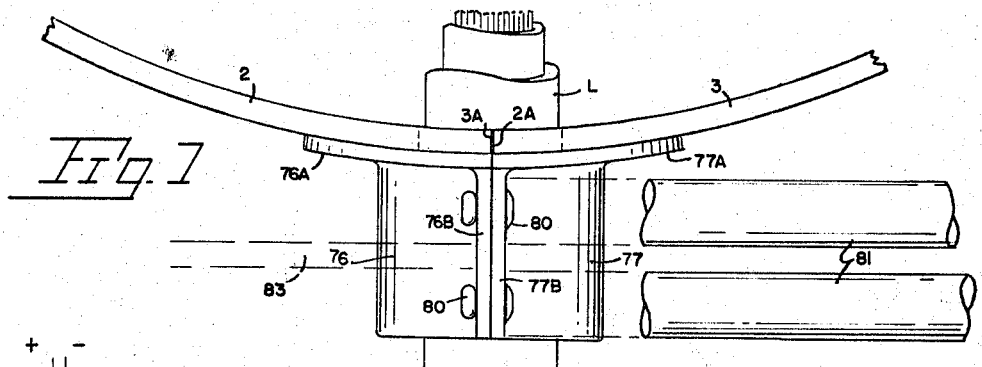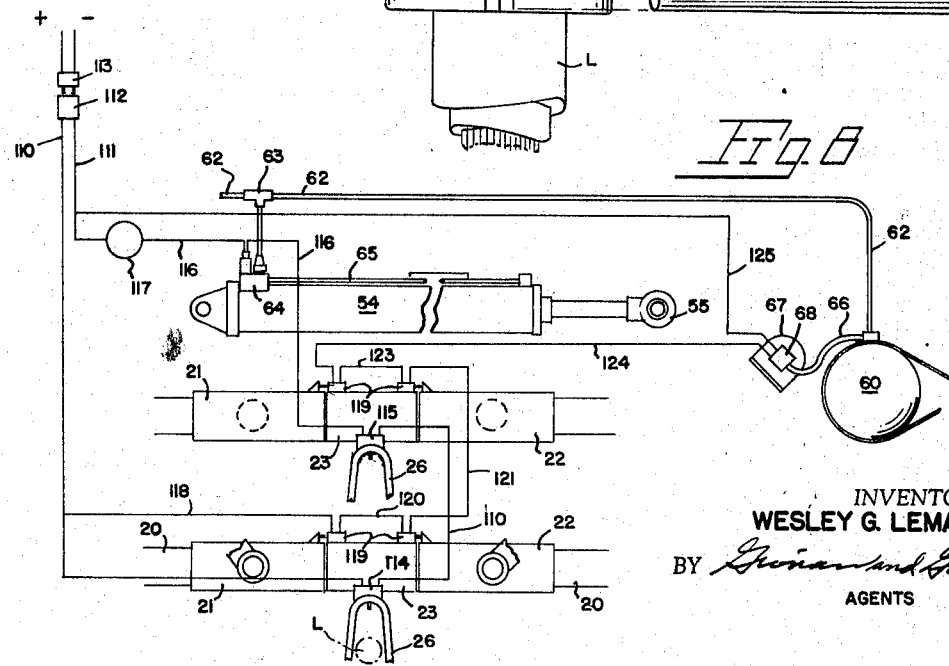

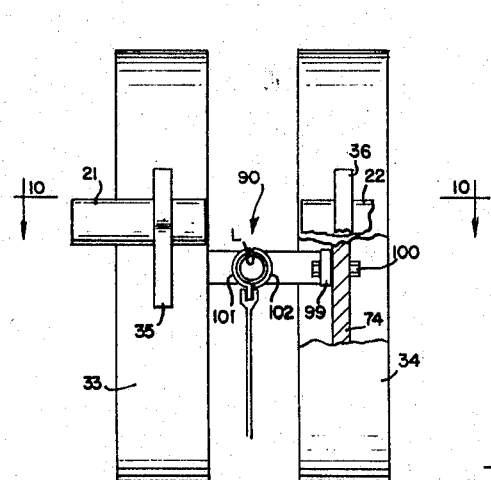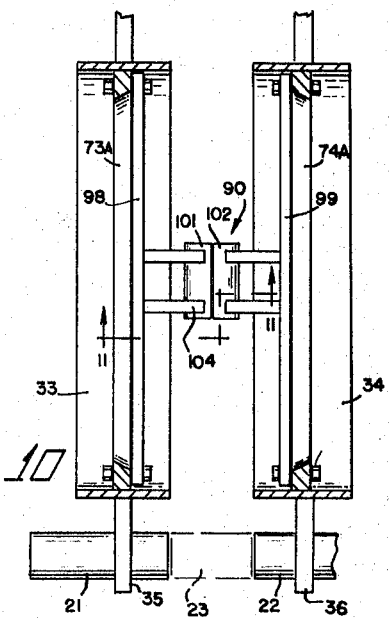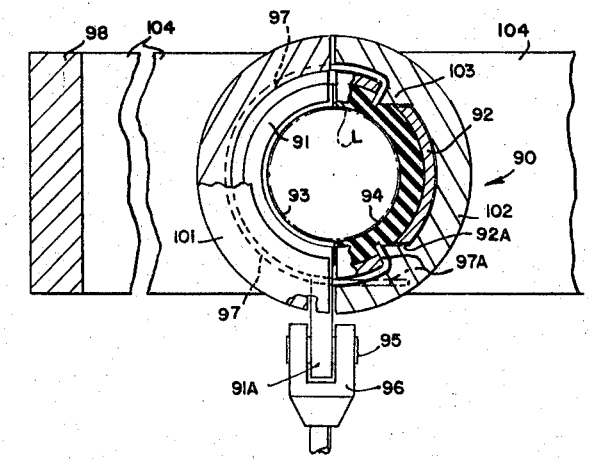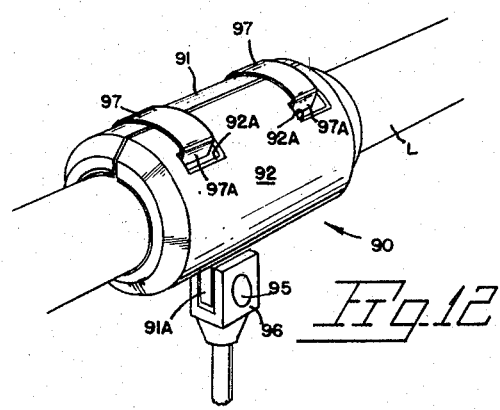
INVENTOR.
WESLEY G. LEMATTA

United States Patent Office 3,430,325
Patented Mar. 4, 1969

3,430,325
APPARATUS FOR SECURING WARNING MARKERS TO CABLES
Wesley G. Lematta, 8510 Patterson Place,
Vancouver, Wash. 98664
Filed June 27, 1966, Ser. No. 560,481
U.S. Cl. 29—203
Int. Cl. B23p *19/00, 19/04;* B21d *39/02*
8 Claims This invention relates to an airborne apparatus for and method of securing warning markers to electrical conductors and particularly cross-country, high voltage transmission lines or cables for the purpose of identifying same as a hazard to low flying aircraft.

It is an important object of the present invention to provide an apparatus adapted to be suspended from a hovering helicopter for the fastening, in a spaced apart manner, of warning markers along an electrical power transmission line. Such lines are supported at intervals by towers of considerable height resulting in the lines being a hazard to light aircraft and especially helicopters which are commonly flown at low altitudes. Transmission lines in mountainous areas present increased hazards by reason of their supporting towers being located on high points of the terrain resulting in the lines carried thereby being several hundred feet above ground level. Their location along with the inconspicuous appearance of such lines when viewed from the air against the ground has resulted in many serious and usually fatal aircraft accidents. A further consequence of such accidents is often the disruption of electrical service to vast areas including complications resulting from uneven power surges to associated power networks.

In view of the danger presented by transmission lines some legislative steps have been taken in some areas of the United States making mandatory the application of marking devices to those transmission lines constituting a significant hazard to flight. For economic reasons such marking has only been to a limited extent since briefly it entails the costly and time-consuming steps of electrically isolating the line, lowering the same to ground level, applying the markers, elevating the line and ultimately returning it to a "hot" condition. Obviously this procedure is extremely costly and particularly so when complicated by the fact that most often those spans of transmission lines to be marked overlies rugged terrain making access thereto for manually securing the markers extremely difficult. Accordingly, it will be readily apparent that the application of warning markers to elevated transmission lines by airborne apparatus as disclosed herein will be possible at a much lower cost than heretofore resulting in a substantial savings both in cost and time thus making it economically feasible to mark all power transmission lines presenting a hazard to flight.

A further object of this invention resides in the warning marker construction wherein means are provided for the accurate alignment and positive securement of the marker's matching hemispherical sections into a unitary sphere upon the transmission line. The marker so formed about the line is of light weight materials and designed to avoid contributing to the undesirable Aeolian vibration common to long spans of such transmission lines. Important to achieving this object is a warning marker having an unobstructed surface and one wherein the components are frictionally insulated to avoid wear of the transmission line but yet grip the same in a manner preventing any relative movement therebetween.

The present invention provides an apparatus of lightweight, tubular framework easily airlifted into operative engagement with a transmission line and having means actuated upon such engagement for the automatic forming and fastening of the marker members into a unitary warning marker. To achieve this the apparatus includes cable receiving guides for accurately supporting the apparatus on the transmission line prior to initiating attachment of the warning marker.

A modified form of the present apparatus has for one of its important objects the provision of means readily incorporated into the apparatus for the alternative securing of a depending type warning marker attached by novel clamping means to a power transmission line. Accordingly, the modification permits, with a minimum substitution of parts, an apparatus equally adapted for securing various types of suspended markers common to the art.

The foregoing and other objects and advantages which will become subsequently apparent reside in the details of construction and operation as more fully hereinafter described and claimed, reference being had to the accompanying drawings forming a part hereof and in which:

FIGURE 1 is a perspective view of the present apparatus suspended from a helicopter and in operative engagement with a power transmission line.

FIGURE 2 is a front elevational view of the apparatus with the hemispherical sections of the warning marker oppositely disposed from the transmission line being marked.

FIGURE 3 is a side elevational view of FIGURE 2.

FIGURE 4 is an enlarged front elevational view of the apparatus with fragments broken away and showing the hemispherical sections of the warning marker as a unit and in fastened engagement about the transmission line.

FIGURE 5 is a sectional elevational view taken along line 5—5 of FIGURE 4 showing one of the marker supporting collars and associated riveting means.

FIGURE 6 is a fragmentary view on an enlarged scale showing the warning marker and particularly that portion thereof in gripping engagement with the power transmission line.

FIGURE 7 is a plan view of FIGURE 6.

FIGURE 8 is an electrical wiring diagram, including associated parts of the apparatus.

FIGURE 9 is a side elevational view of hemisphere-supporting collars removed from the apparatus and modified for securing a clamp about a power transmission line.

FIGURE 10 is a horizontal sectional view taken approximately along line 10—10 of FIGURE 9 showing cooperating crossmembers mounted within the collars including clamp bearing members.

FIGURE 11 is a sectional, elevational view taken approximately along line 11—11 of FIGURE 10 and showing, on an enlarged scale, the details of the clamp.

FIGURE 12 is a perspective view of the clamp in place on a section of the power transmission line.

With continuing reference to the drawings wherein like numerals designate like parts and particularly FIGURES 1 through 3 thereof, power transmission lines L supported by towers T in the conventional manner are shown strung across and elevated from the rim of a canyon or the like. The towers T support the transmission lines at a considerable height above the ground and where canyons, gorges, etc., are crossed such heights exceed several hundred feet, placing them at an elevation within the airspace used by light aircraft. The reference numeral 1 indicates generally the present apparatus suspended from a hovering helicopter H into engagement with one of the two transmission lines. In mountainous country, when such lines are viewed from an aircraft against the background of the hills and forests they are rendered practically invisible from a distance, often resulting in disastrous consequences. To render visible the location of such lines warning markers are often applied thereto in the cumbersome manner as previously noted.

The warning markers of the present invention are indicated generally at 4 and consist essentially of two hemispherical sections 2 and 3, as best illustrated in FIGURE 2, which are automatically joined together to provide a unitary sphere in secure engagement with the transmission line at any desired interval therealong as shown.

As illustrated in FIGURES 2 and 3, the apparatus for securing the markers, as aforesaid, comprises an open, tubular main body, indicated generally at 1, in the form of two horizontally spaced, upright frame members indicated at 5 and 6 which are identical other than for their left and right hand disposition as shown in FIGURE 3. Frame member 5 includes a pair of legs 7 and 8 (FIGURE 2) identical with a pair of frame members 6 indicated at 9 and 10, all of single tubular construction. Each pair converges upwardly to an apex whereat both frames are interconnected by a horizontal crossmember 11 and thereat provided with shackles 12 for receiving hooks 13 secured in an insulated manner as at 13A to the end of lifting cables 14 depending from a helicopter H. In addition to crossmember 11, vertically spaced apart pairs of crossmembers 15, 16, 17 and 18 further secure frame members 5 and 6 in spaced apart relationship.

Each frame 5 and 6 is individually and internally braced by transverse tubular crossmembers as at 19 and 20 with the latter constituting a carrier for opposed pairs of sleeve type slide bearings 21–22. Serving as limit stops for inward movement of both pairs of the slide bearings 21 and 22 are a pair of stationary collars permanently secured to the center of their respective crossbars 20. Secured to the underside of each stationary collar 23 is the upper terminus of a power line guide 26 in the form of an angularly bent plate whose bottom portion diverges downwardly and outwardly as at 27 into reinforced securement to the bottom end of the inwardly turned (as viewed in FIGURE 2) end portions of the legs of its respective frame member. Both line guides are reinforced by diagonal bracing 30. At the apex of each guide 26 is a pressure actuated switch 114–115. Stationary collars 23 carry similar type switches 119 all being more fully hereinafter described.

As previously stated, each warning marker comprises two mtaching hemispherical sections 2 and 3, which preparatory to being united into engagement about the transmission line L, are held within opposed collars indicated at 33 and 34. The collars are provided respectively with outwardly projecting brackets 35 and 36 which in turn are secured to and carried by their respective slide bearings 21 and 22.

The opposed pairs of bearings 21–22 slidably carried by crossmembers 20 are operable simultaneously toward and away from the stationary collars 23 by pairs of depending arms 38–39 pivotally connected at their bottom ends respectively as at 40 and 41 to said slide bearings 21–22. The top end of each arm of each pair of arms is also pivotally attached as at 42 and 43 to the outer end of pairs of toggle links 44–45 whose inner ends are pivotally attached as at 46 to the pair of crossmembers 19. The arms of each of the pairs 38–39 are interconnected near their center section respectively by tubular crossarms 50–51. Pivotally mounted medially on crossarm 50 is the cylinder end of a double acting air cylinder 54 whose rod 56 is pivotally connected as at 55 to the other crossarm 51.

As best illustrated in FIGURE 4, a pair of pressurized air reservoirs in the form of tanks 60 are secured as by straps 61 to the lower crossmembers 18 intermediate frames 5 and 6 and are in circuit through conduits 62, a T-fitting 63, a first solenoid actuated valve 64 and alternately line 65, with both ends of the double acting cylinder 54. From the foregoing it will be apparent that opening one side of the solenoid valve 64 will direct air pressure to the cylinder side thereof to open the pairs of arms 38–39 and collars 33–34 to their loading position shown in FIGURE 2 and conversely by repositioning valve 64 air pressure will be directed through the by-pass line 65 into the rod end of the cylinder causing rod 56 to be retracted closing arms 38 and arms 39 to the position shown in FIGURE 4. Solenoid valve 64 is electrically controlled by closing of a circuit through conductors 110 and 116, as later described.

In communication with one of the air tanks 60 through an air line 66 is a conventional air-hydraulic cylinder 67 comprising part of a riveting system provided with a second solenoid actuated control valve 68 for controlled pressurization thereof from one of the tanks 60 through line 66. End plates 69, as shown in FIGURE 5, serve as mounting brackets to secure the cylinder 67 to a support 70 which in turn is secured at its ends to the diverging portions 27 of the cable guides 26. The hydraulic side of cylinder 67 is in communication with riveting tools 81 through a flexible conduit 72, pressure distributing manifold 71 and a plurality of lines 82.

The collars 33–34 are provided with an internal ring as at 73–74, the inner circumference of which, 73A–74A (FIGURE 4), receives in seated, circumscribing engagement their respective hemispheres 2 and 3. Each of the hemispherical sections 2 and 3 are preferably formed from colored Fiberglas material ranging in diameter from approximately three to five feet. Preparatory to airlifting the apparatus, the sections are positioned within the rings 73A–74A and their matching edges 2A–3A coated with a pressure sensitive plastic bonding agent suitable for exposure to all climatic conditions. A first pair of diametrically mounted castings one of which is shown at 76 in FIGURE 6, cooperates with a second pair of castings 77 (similarly shown) to securely grip the transmission line L upon fastening together of the sections 2 and 3. Each casting includes a semicircular flange 76A–77A and is thereat fastened to its respective hemispherical section 2 and 3. Halves 78–79 of a neoprene liner within the castings are compressed about the line L insulating the same from wearing contact with the metal castings. Each casting further includes radially extending flanges 76B–77B correspondingly apertured for the reception of fastening elements 80 preferably of the blind rivet type shown. Rivet fastening tools, indicated at 81 and served by lines 82 are of the conventional type including internal pressure responsive means for the sequential gripping and pulling of a rivet mandrel deforming the rivet body and ultimately resulting in axial separation of the mandrel completing the rivet cycle. As shown in FIGURE 6, an upper and a lower pair of riveting tools are provided but it will be apparent that in certain applications the number or type of such fastening tools may vary from that shown. The outwardly projecting brackets 36, in addition to carrying collar 34, function as supporting means for the riveting tools 81, as best shown in FIGURE 4. The other pair of outwardly projecting brackets 35 each carry a backing plate 83 which supports the castings 76 during the riveting cycle.

A modified form of warning marker (not shown) includes an inwardly extending flange provided about the matching edges 2A–3A. Additional riveting tools 81 are circumferentially spaced about the ring 74 for extension through openings in the hemispherical member 3A for the securement of fasteners through said flanged portions of each member.

FIGURES 9 through 12 of the drawings disclose a modified form of the invention wherein, instead of affixing a warning marker about the transmission line, a marker-supporting clamp, indicated generally at 90, is secured therearound. The clamp 90 comprises aluminum castings 91 and 92 of semicircular section each having a neoprene liner as at 93 and 94 confined therewithin. A downwardly extending member 91A integral with casting 91 is apertuerd to receive a pivot pin 95 which also extends through a bifurcated fitting 96 from which a warning marker (not shown) is suspended.

The castings 91 and 92 of the clamp, are held in biased engagement about the transmission line L by a pair of clips 97 having inwardly bent ends 97A terminating interiorly of casting 92 through openings 92A formed therein. The apparatus 1, specifically collars 33–34, are altered slightly as shown in FIGURES 9 and 10 wherein the rivet fastening tools 81 are removed from the brackets 36 while internally, within each of the collars, horizontally disposed plates 98 and 99 are attached as at 100 to the internal rings 73–74. Each of the casting halves 91–92 are retained prior to engagement within holders 101 and 102, respectively, the latter being provided with four inwardly projecting forming elements as at 103 in FIGURE 11, for turning the clip ends 97A inwardly from their broken line position through openings 92A upon closing of the holders. The holders 101 and 102 are securely mounted by brackets 104 welded to the plates 98–99.

The wiring circuit of FIGURE 8 discloses that portion of the electrical system associated with the apparatus 1 with the conductors 110–111 terminating in a frame mounted receptacle 112 for a plug 113 in circuit with a source of electrical power provided by the helicopter H. A first circuit directs current from the positive side of the source by conductor 110 ultimately through the solenoid valve 64 on cylinder 54 upon simultaneous closing of series wired pressure actuated switches 114–115 by positioning of the apparatus 1 in resting engagement upon the transmission line L. The first circuit is completed from solenoid valve 63 to the negative side of the source through lead 116 and a timer switch 117. Accordingly, initial energizing of the solenoid valve 64 directs a flow of pressurized air through the bypass line 65 to the rod end of the cylinder 54 resulting in inward movement of the hemispherical sections 2 and 3 through the previously descirbed means.

Consequent inward positioning of pairs of slide bearings 21–22 establishes a second circuit including conductor 110, lead 118, four pressure actuated switches indicated at 119 connected in series by conductors 120, 121, 123 and the second solenoid valve 68 via conductor 124 and back to the negative side 111 by lead 125. Valve 68 is thereby opened permitting the air-hydraulic cylinder 67 of the riveting system to be pressurized to start the riveting cycle. Timer 117 is preset to a selected duration allowing the required time for both for the inward travel of the pairs of slide bearings 21–22 and completion of the riveting cycle initiated by said bearings closing the pressure actuated switches 119. Opening of the first circuit by timer 117 causes solenoid valve 64 to return to its normal position wherein pressurized air is directed to the cylinder side of its piston with simultaneous venting of the rod end of the cylinder occurring through bypass line 65. While but one wiring arrangement is shown, it is obvious that variations therein may be desired. One such variation includes provision of a separate and overriding circuit for solenoid valve 64 with control means therefor disposed within the helicopter for immediate retraction of collars 33–34 and the hemispherical sections 2 and 3 carried therein.

If desired weighted elements (not shown) may be secured as necessary intermediate the frames 5 and 6 at the lowermost extension of their legs to provide a stable apparatus capable of maintaining an upright positioning unaided by a lifting force on cables 14.

In operation the apparatus 1 is, prior to air-lifting from a worksite, prepared in the following manner. The rivet fastening tools 81 are each provided with a blind rivet fastener comprising a rivet body and mandril, said fastener extending through flanges 77B. Subsequently hemispherical sections 2 and 3 are inserted within the rings 73–74 of their respective collars 33–34 which are now in the spaced apart position of FIGURE 2. The air tanks 60 are charged, by suitable external means, to approximately 100 p.s.i.

While at the worksite the helicopter is positioned in a hovering manner over the apparatus for connection of the electrical system provided by plug 113 and receptacle 112, and the hooks 13 of lifting cables 14 are inserted within the shackles 12. Airlifting of the apparatus will be accomplished with the collars 33–34 in parallel relationship to the longitudinal axis of the helicopter by reason of the lifting cables 14 being in fore and aft suspension from the helicopter. Upon vertical alignment of the apparatus with the transmission line to be marked the helicopter descends initially engaging the guides 26 with the power line L and ultimately resulting in the latter occupying the upper terminus of both guides. Pressure actuated switches 114–115 are closed by the line L, in turn closing the first circuit through solenoid valve 64 and timer 117. Inward positioning of the pairs of slide bearings 21–22 by retraction of the air cylinder 54 and its rod 56 and their associated pairs of arms 38–39 completes a second circuit previously described through the four pressure actuated switches 119 and solenoid valve 68 to activate the riveting means by pressurization of air-hydraulic cylinder 67 including each of the riveting tools 81 through hydraulic lines 82. The hemispherical sections 2 and 3 are accordingly joined to form a warning marker 1 bonded to one another along their matching edges 2A–3A as earlier described and with the neoprene liners 78–79, interior of castings 76–77, in gripping compression about the transmission line L.

Opening of the first circuit by timer 117 results in the extension of air cylinder 54-rod 56 to open the pairs of arms 33–34 whereupon ascent of the helicopter disengages the apparatus 1 from the line for return to the worksite to complete one cycle of operation.

The operation of the present invention embodying the modified form thereof differs slightly from the foregoing operation in that the halves 91–92 of clamp 90 are secured about the transmission by the deforming of the clips 97 upon closing of the rings 33–34. The warning marker so attached is of the suspended type.

While I have shown modified forms of the present invention it will be understood that other modifications will be apparent to those skilled in the art without departing from the spirit and scope of the invention as defined in the appended claims.

Having thus described the invention, what is claimed as new and desired to be secured by Letters Patent is:

1. Apparatus for the securement of warning markers to portions of elevated cables, said apparatus comprising,
 a frame adapted to be airlifted into engagement with a portion of elevated cable,
 cable guide means carried by said frame accurately aligning said frame on said cable portion,
 marker supporting means carried by said frame and transversely positionable relative to said cable portion,
 pressure responsive means operatively linked with said marker supporting means for positioning the marker supporting means adjacent the cable portion for securement by said marker supporting means of a warning marker thereto.

2. The apparatus as claimed in claim 1 wherein said frame is of lightweight open tubular construction substantially unaffected by wind pressure.

3. The apparatus as claimed in claim 1 including a first electrical control circuit for said pressure responsive means, said circuit including switch means actuated by pressured contact with said elevated cable.

4. The apparatus as claimed in claim 1 wherein said marker supporting means includes a pair of axially spaced collars oppositely disposed from the cable portion and each of said collars adapted to receive corresponding hemispherical members constituting a spherical warning marker when joined.

5. The apparatus as claimed in claim 1 wherein said marker supporting means includes fastening tools for securing said warning marker into biased engagement with the elevated cable.

6. The apparatus as claimed in claim 3 including a second electrical control circuit, said second circuit including pressure sensitive switches closed upon inward positioning of said marker supporting means for activating said fastening tools.

7. The apparatus as claimed in claim 1 wherein said marker supporting means includes a pair of clamp receiving holders each adapted to receive opposing clamp elements, and one of said clamp elements having a warning marker suspended therefrom.

8. The apparatus as claimed in claim 7 wherein one of said clamp receiving holders of said pair includes forming means engageable with bendable clip members carried by one of said clamp elements.

References Cited

UNITED STATES PATENTS

| | | | |
|---|---|---|---|
| 1,649,752 | 11/1927 | Stone | 285—373 |
| 2,654,272 | 10/1953 | Warren | 29—505 |
| 3,135,236 | 6/1964 | Pfeiffer et al. | 116—114 |
| 3,362,377 | 1/1968 | Hill et al. | 116—114 |
| 2,825,599 | 3/1958 | Dent | 294—110 XR |
| 3,098,289 | 7/1963 | Demler | 29—203 |

FOREIGN PATENTS

| | | |
|---|---|---|
| 1,284,766 | 1/1962 | France. |
| 701,422 | 1/1965 | Canada. |

JOHN F. CAMPBELL, *Primary Examiner.*

RICHARD BERNARD LAZARUS, *Assistant Examiner.*

U.S. Cl. X.R.

29—238, 463; 116—114; 294—110